(12) United States Patent
Rothoff et al.

(10) Patent No.: US 8,851,257 B2
(45) Date of Patent: Oct. 7, 2014

(54) FLUID ACCUMULATOR CHAMBER

(75) Inventors: Andreas Rothoff, Markdorf (DE);
Frank M. Haase, Markdorf (DE)

(73) Assignee: BorgWarner Inc., Auburn Hills, MI (US)

( * ) Notice: Subject to any disclaimer, the term of this patent is extended or adjusted under 35 U.S.C. 154(b) by 235 days.

(21) Appl. No.: 13/380,240

(22) PCT Filed: Jul. 2, 2010

(86) PCT No.: PCT/US2010/040867
§ 371 (c)(1),
(2), (4) Date: Dec. 22, 2011

(87) PCT Pub. No.: WO2011/005670
PCT Pub. Date: Jan. 13, 2011

(65) Prior Publication Data
US 2012/0261014 A1 Oct. 18, 2012

(30) Foreign Application Priority Data
Jul. 10, 2009 (DE) .......................... 10 2009 032 538

(51) Int. Cl.
*F16D 35/02* (2006.01)
(52) U.S. Cl.
CPC ..................................... *F16D 35/02* (2013.01)
USPC ........................................ 192/58.5; 192/58.4

(58) Field of Classification Search
USPC ........................................ 192/58.7, 58.8, 58.5
IPC .............................. F16D 35/02,35/027, 35/029
See application file for complete search history.

(56) References Cited

U.S. PATENT DOCUMENTS

| | | | | |
|---|---|---|---|---|
| 2,140,886 A | * | 12/1938 | Staats | 192/58.91 |
| 4,940,121 A | | 7/1990 | Digele | |
| 5,117,956 A | * | 6/1992 | Tsujita | 192/60 |
| 5,452,782 A | * | 9/1995 | Inoue | 192/58.63 |
| 5,806,645 A | * | 9/1998 | Bhookmohan et al. | 192/70.12 |
| 6,056,098 A | | 5/2000 | Brown et al. | |
| 6,085,881 A | * | 7/2000 | Robb | 192/58.682 |

FOREIGN PATENT DOCUMENTS

| | | |
|---|---|---|
| JP | 0727149 | 1/1995 |
| KR | 10-0582819 | 5/2006 |

* cited by examiner

*Primary Examiner* — Rodney H Bonck

(57) ABSTRACT

The present invention relates to a fluid accumulator chamber (1) of a fluid clutch device having an inner boundary wall (2) which runs around a central axis of rotation (M), having an outer boundary wall (3) which runs around axis of rotation (M), and having at least one filling opening (4) arranged in the outer boundary wall (3), wherein the outer boundary wall (3) has, at the location of the filling opening (4), a maximum spacing (R1) to the central axis (M), which spacing decreases continuously to a point (P) of minimum spacing (R3) to the central axis (M).

2 Claims, 1 Drawing Sheet

FLUID ACCUMULATOR CHAMBER

TECHNICAL FIELD

The invention relates to a fluid accumulator chamber of a fluid clutch device.

BACKGROUND

The fluid clutch device which can be provided with an accumulator chamber is known from DE 699 11479 T2.

It is an object of the present invention to provide a fluid accumulator chamber of a fluid clutch device which permits an increase in the fluid pressure (oil pressure) at the filling opening.

SUMMARY OF THE INVENTION

Said object is achieved by means of the present invention which includes a fluid accumulator chamber of a fluid clutch device having inner and outer boundary walls which run around a central axis of rotation and at least one fill opening arranged in the outer boundary wall. The outer boundary wall has at the filling opening a maximum spacing to the central axis, which spacing decreases continuously to a point of minimum spacing to the central axis.

Preferably, the filling opening and point of minimum spacing are 180° apart. If there are a plurality of filling openings, the points of minimum spacing are provided between the filling openings.

It is advantageously obtained by means of the fluid accumulator chamber that a lower fluid quantity (oil quantity) is required, which leads to cost savings during operation.

BRIEF DESCRIPTION OF THE DRAWINGS

Further details, features and advantages of the invention will emerge from the following description of exemplary embodiments on the basis of the drawing, in which.

DESCRIPTION OF THE PREFERRED EMBODIMENT

An embodiment of a fluid accumulator chamber according to the invention of a fluid clutch device will be described with reference to a juxtaposition of FIGS. 1 and 2.

Figure 1:
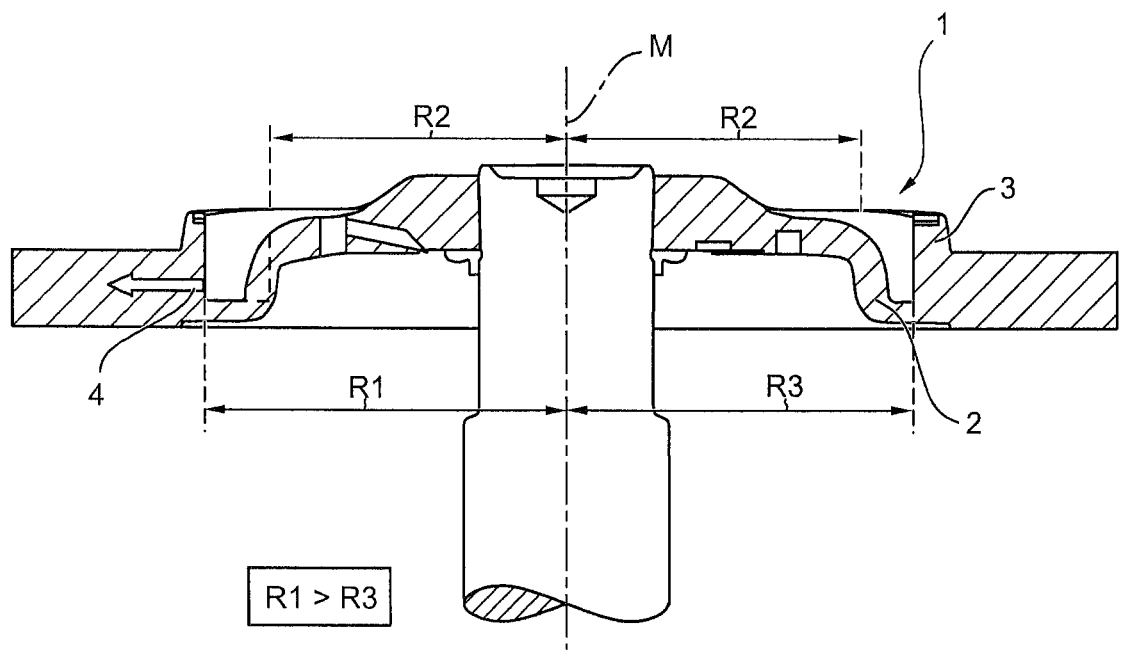
FIG. 1 shows a partially cut-away side view of a fluid clutch device having a fluid accumulator chamber according to the invention.

FIG. 1 shows a partially cut-away side view of a fluid clutch device having a fluid accumulator chamber 1 according to the invention. As can be seen from FIG. 1, the fluid clutch device has an inner boundary wall 2 which runs around a central axis of rotation M and an outer boundary wall 3 which runs around the central axis of rotation M. Furthermore, at least one filling opening 4 is arranged in the outer boundary wall 3. Here, the outer boundary wall 3 has, at the location of the filling opening 4, a maximum spacing R1 to the central axis M. As can be seen from the illustration of FIG. 2, said maximum spacing R1 decreases continuously from the region of the filling opening 4 to a point P, and has a minimum spacing R3 at the point P. Here, in the case of the one filling opening 4 which is provided, the point P of minimum spacing R3 is arranged offset with respect to the filling opening 4 by 180°, that is to say is arranged substantially opposite the filling opening 4.

In the case of a plurality of filling openings 4, distributed over the circumference of the outer boundary wall 3, of the fluid accumulator chamber 1 according to the invention of the fluid clutch device, the points P of minimum spacing R3 of the fluid accumulator chamber 1 are provided in each case between the filling openings 4 and preferably centrally between the filling openings 4.

Figure 2:
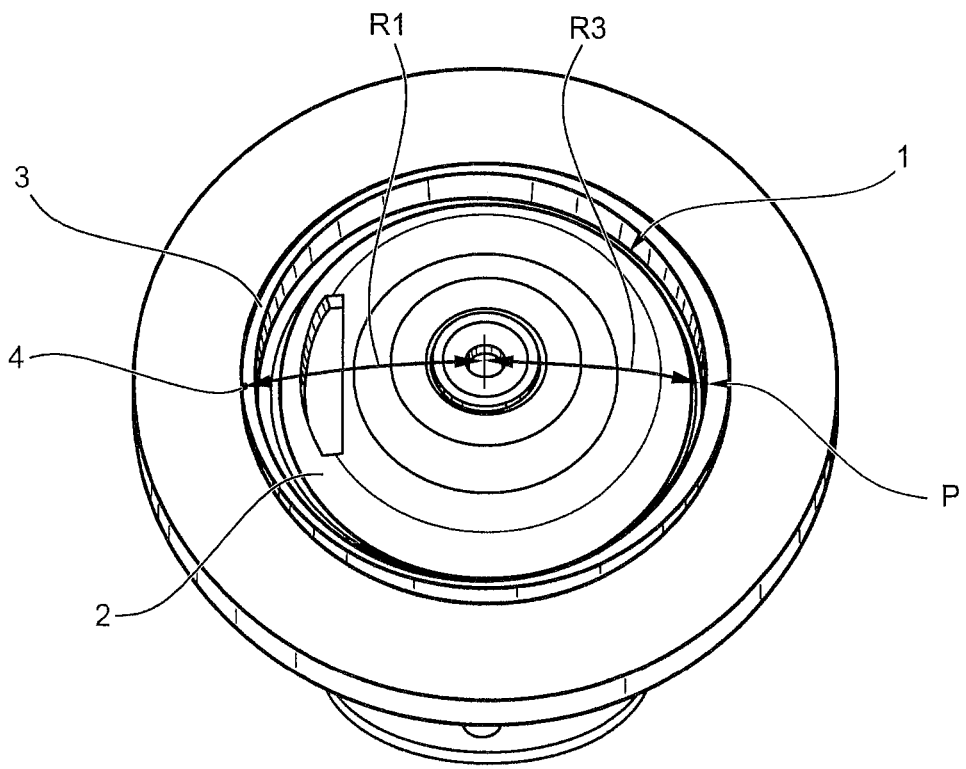
FIG. 2 shows a perspective view of the top side of the fluid clutch device.

As can be seen from FIGS. 1 and 2, the fluid accumulator chamber 1 is formed, in relation to the central axis M, with the continuously increasing spacing R1 up to the filling opening 4 and with the spacing R3 which decreases continuously from the filling opening 4 to the point P. As a result of this eccentrically arranged or formed fluid accumulator chamber 1, a fluid which is contained therein is moved into the circumferential region of the filling opening 4 (with the greatest spacing R1 to the central axis M) as a result of the centrifugal force during the rotation of the fluid clutch device. Accordingly, the pressure in the filling opening 4 is increased in relation to the fluid clutch devices with concentrically arranged fluid accumulator chambers of the prior art. Furthermore, in this way, a comparatively small fluid quantity is required for operating the fluid clutch device, which results in reduced costs and additionally provides the advantage that a fluid clutch device with relatively small fluid quantity can have faster reaction times.

In the fluid accumulator chamber according to the invention of the fluid clutch device having one filling opening, in addition to the above-described shape of the inner boundary wall 2, an oval or polygonal shape is alternatively also possible with the same advantages.

To supplement the disclosure, reference is made explicitly to the diagrammatic illustration of the invention in FIGS. 1 and 2.

Although the invention has been described with respect to preferred embodiments, it is to be also understood that it is not to be so limited since changes and modifications can be made therein which are within the full scope of this invention as detailed by the following claims.

The invention claimed is:

1. A fluid accumulator chamber (1) of a fluid clutch device
having a continuous circular inner boundary wall (2) which runs around a central axis of rotation (M),
having a concentric continuous circular outer boundary wall (3) which runs around a central axis of rotation (M), and
having at least one filling opening (4) arranged in said outer boundary wall (3), wherein
the outer boundary wall (3) has, at the location of the filling opening (4), a maximum spacing (R1) to the central axis (M), which spacing decreases continuously to a point (P) of minimum spacing (R3) to the central axis (M);
wherein for each filling opening there is a said point (P) of minimum spacing (R3) offset with respect to the filling opening (4) by substantially about 180°.

2. The fluid accumulator chamber (1) as claimed in claim 1, wherein there are several filling openings provided in said outer boundary wall and spaced uniformly around the surface of said outer boundary wall, and wherein a said point of minimum spacing is provided between each of said filling openings.

* * * * *